United States Patent [19]

Worp

[11] Patent Number: 5,046,829
[45] Date of Patent: Sep. 10, 1991

[54] LIQUID CRYSTAL DISPLAY BACKLIGHTING APPARATUS HAVING COMBINED OPTICAL DIFFUSER AND SHOCK DAMPENING PROPERTIES

[75] Inventor: Nicholas J. Worp, Lantana, Fla.

[73] Assignee: Motorola, Inc., Schaumburg, Ill.

[21] Appl. No.: 345,742

[22] Filed: May 1, 1989

[51] Int. Cl.$^5$ .............................................. G02F 1/13
[52] U.S. Cl. ........................................ 359/49; 359/69
[58] Field of Search ............ 350/345, 331 R; 362/31, 362/104, 297

[56] References Cited

U.S. PATENT DOCUMENTS

| | | | |
|---|---|---|---|
| 4,630,895 | 12/1986 | Abdala et al. | 362/297 |
| 4,649,381 | 3/1987 | Masuda et al. | 350/345 |
| 4,714,983 | 12/1987 | Lang | 350/345 |
| 4,729,185 | 3/1988 | Baba | 362/31 |
| 4,929,062 | 5/1990 | Guzik et al. | 350/345 |

Primary Examiner—Rolf Hille
Assistant Examiner—S. V. Clark
Attorney, Agent, or Firm—William E. Koch; Vincent B. Ingrassia; Anthony J. Sarli, Jr.

[57] ABSTRACT

A light guide is optically coupled to a light source and engagingly positioned between a liquid crystal display and a printed circuit board for both damping vibrations from and backlighting the liquid crystal display.

11 Claims, 3 Drawing Sheets

LIQUID CRYSTAL DISPLAY BACKLIGHTING APPARATUS HAVING COMBINED OPTICAL DIFFUSER AND SHOCK DAMPENING PROPERTIES

FIELD OF THE INVENTION

This invention relates in general to display systems and more particularly to a combination optical diffuser and snubber for backlighting a liquid crystal display.

BACKGROUND OF THE INVENTION

Displays which are capable of forming images of characters or patterns may be broadly broken down into two different categories, active and passive. In active displays, such as light emitting diode (LED) displays, the images are composed of individual diodes which emit their own light. Since active displays are typically characterized by high power consumption, the choice for low power applications, such as portable calculators, watches, portable radios, and pocket pagers, is typically the passive display. An example of a passive display is the liquid crystal display (LCD). Rather than emitting their own light, LCD images merely reflect or absorb light, therefore, ambient sun light or room light is normally required to view the display. When the ambient light intensity in not sufficient to illuminate the display, however, an internal supplemental illumination means is typically provided. In a simple supplemental illumination system, one or more light sources, typically incandescent lamps, are placed behind or in front of the display. One of the disadvantages of the simple supplemental illumination system is the creation of "hot spots". "Hot spots" result in poor display readability. To correct the problem of "hot spots" and to more evenly distribute the light coming from the light sources, a light guide may be positioned behind the liquid crystal display.

Previously known light guides typically comprise a slab of transparent plastic material such as polycarbon and have light sources such as LEDs positioned therewithin. The plastic material may have selected sides painted with a reflecting coating and be shaped, i.e., a "V", in order to direct more light towards the back of the LCD.

Another previously known and more complex LCD lightguide disclosed in U.S. Pat. No. 4,630,895, assigned to the assignee of the present invention, illustrates how a multi-surfaced lightguide may reduce "hot spots".

In addition to efficient backlighting, display systems generally require some type of shock absorption. This shock absorption typically has been provided by snubbers, i.e., rubber gaskets and pads, and elastomer connectors, placed against the LEDs, between the light guide and the LCD, or against the LCD opposite the light guide. The previously known display systems comprised a stand alone element including a housing.

Although the prior art light guides provide backlighting and snubbers provide shock absorption, they have one major disadvantage of thickness. Thinness is extremely important in the design of small watches, pocket calculators, pocket pagers, portable radios and any other device in which small packaging size is paramount. Therefore, it would be an improvement to decrease the impact on thickness of these two elements on the display system.

Thus, what is needed is a combination optical diffuser and snubber for backlighted liquid crystal display systems.

SUMMARY OF THE INVENTION

Accordingly, it is an object of the present invention to provide an improved display system.

Another object of the present invention is to provide a combination optical diffuser and snubber for backlighted liquid crystal display systems.

Yet another object of the present invention is to provide a method of packaging a liquid crystal display in combination with a printed circuit board.

In carrying out the above and other objects of the invention in one form, there is provided a light guide optically coupled to a light source and engagingly positioned between a liquid crystal display and a printed circuit board for both damping vibrations from and backlighting the liquid crystal display.

The above and other objects, features, and advantages of the present invention will be better understood from the following detailed description taken in conjunction with the accompanying drawings.

DETAILED DESCRIPTION OF THE INVENTION

Figure 1:
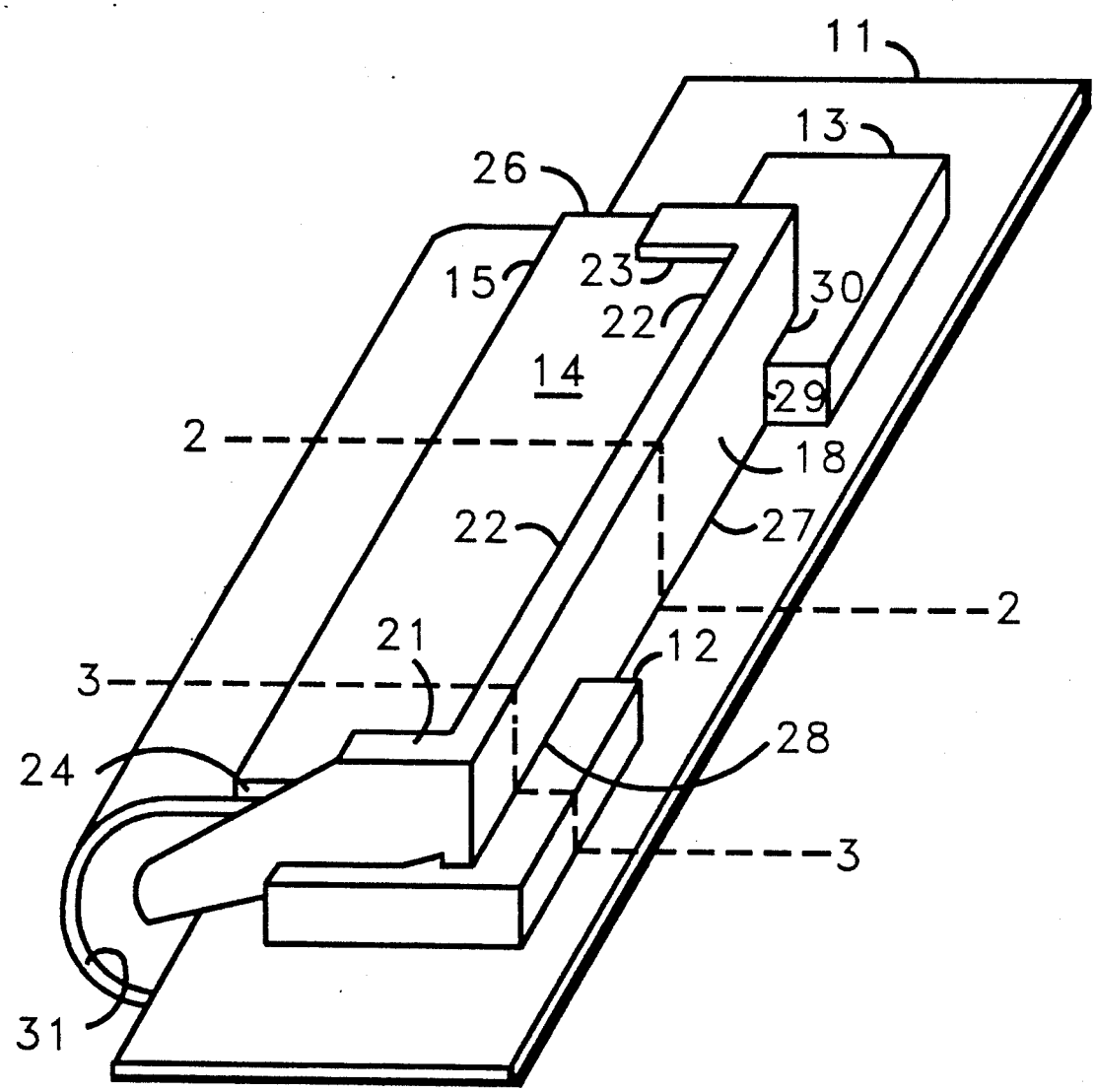
FIG. 1 is a perspective view of the preferred embodiment of the LCD system.

Referring to the figures, the display system comprises a printed circuit board 11 having integrated circuits 12 and 13 positioned thereon. The printed circuit board 11 typically would have a plurality of integrated circuits, as well as a plurality of other circuit elements such as resistors and capacitors positioned thereon. A liquid crystal display 14, comprising an upper glass plate 15 and a lower glass plate 16, is coupled to the printed circuit board 11 by a flexible circuit material 17. As is well known to those skilled in the art, the liquid crystal display 14 comprises a cell containing a thin layer of liquid crystal material between a plurality of segmentary electrodes. When an electric field is applied between the electrode of any one of the segmentary electrodes, the liquid crystal material therebetween becomes aligned with the electric field, so that the light which passed through the front polarizer is absorbed by the rear polarizer and appears "on". The flexible material 17 may comprise any material, such as Kapton, that allows for electric conductive paths to be imprinted thereupon.

A light guide 18 is positioned against the bottom 19 of the liquid crystal display 14 and includes flanges 21, 22, and 23 that extend along and on top of the edges 24, 25, and 26, respectively, of the liquid crystal display 14. The light guide 18 extends to the surface 27 of the integrated circuit 11 and may surround any circuit elements, such as integrated circuits 12 and 13 at surfaces 28, 29, and 30. The light guide 18 further is contiguous to a side 31 of the flexible circuit material 15. One or more light sources, such as light emitting diodes 32 and 33, are coupled to the side 31 of flexible material 17 and are optically coupled to the light guide 18. Alternatively, the light sources could be placed elsewhere, such as on the integrated circuit 11. The light guide 18 is manufactured from a transparent slab, preferably made from silicone. Although silicone is the preferred material for the light guide 18, other materials such as clear acrylic are also suitable. Clear acrylic has better optical properties than silicone, but silicone has superior molding properties and provides better shock absorption.

Figure 2:
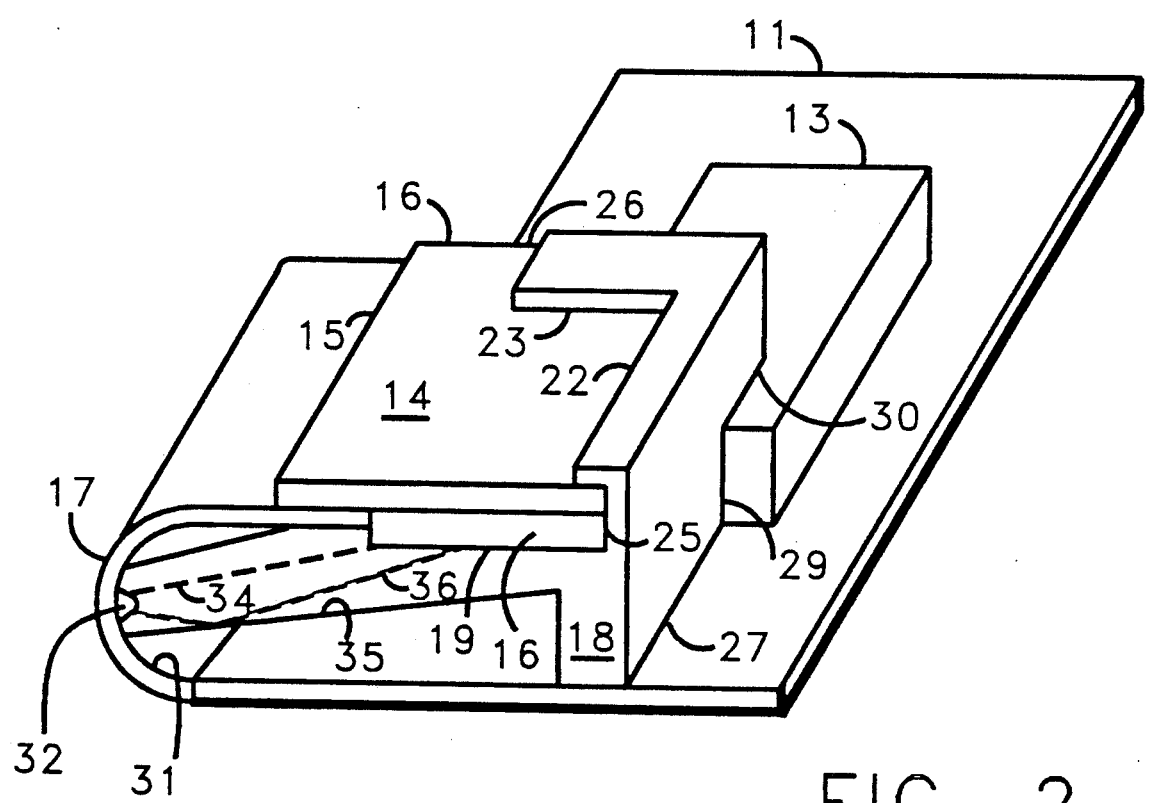
FIG. 2 is a perspective cross sectional view taken along the line 2—2 of FIG. 1.
Figure 3:
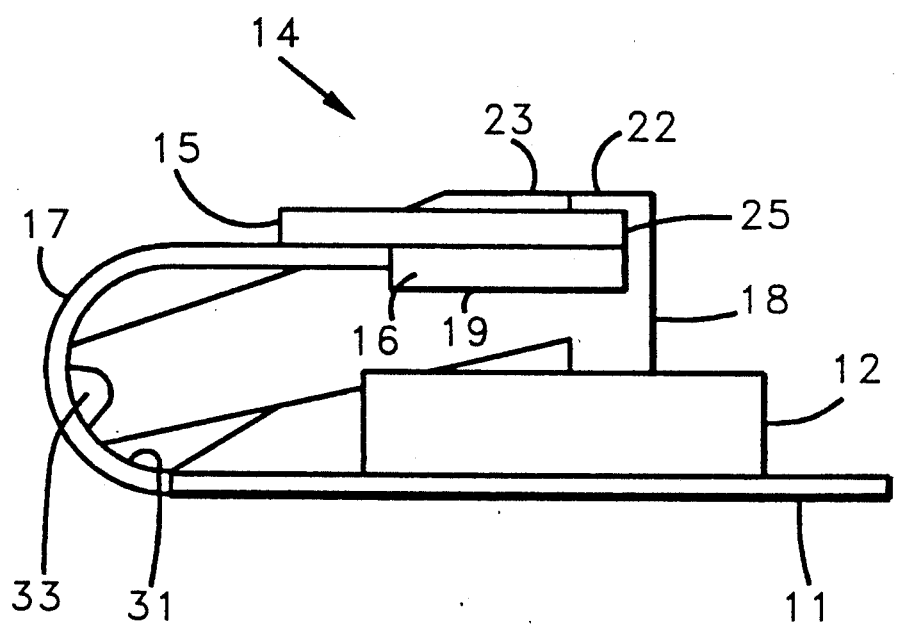
FIG. 3 is a cross sectional view taken along the line 3—3 of FIG. 1.

Referring specifically to FIG. 2, it may be seen that light emitted from LED 32 travels through light guide 18 directly to the bottom surface 19 of the liquid crystal display 14 as illustrated by light ray 34, or by reflecting off of the surface 35 of light guide 18 as illustrated by light ray 36.

By now it should be appreciated that there has been provided a combination optical diffuser and snubber for backlighted liquid crystal display systems.

I claim:

1. A display system comprising:
    a platform;
    first means for providing a display;
    second means for providing light; and
    third means optically coupled to said second means and engagingly positioned between said first means and said platform, said third means having a flange and a body, said flange securing said first means to said body, for securing said first means to said platform, and for both damping vibrations from and backlighting said first means.

2. The display system according to claim 1 wherein said third means comprises silicone.

3. The display system according to claim 1 wherein said platform is a printed circuit board electrically coupled to said first means.

4. The display system according to claim 3 wherein said first means comprises a liquid crystal display.

5. The display system according to claim 4 further comprising a flexible printed circuit material coupled between said printed circuit board and said first means for providing said electrical coupling.

6. The display system according to claim 5 wherein said second means is positioned on said flexible printed circuit material.

7. A display system for attachment to a printed circuit board, comprising:
    means for providing a display;
    an electrical conductor coupled between said display means and said printed circuit board;
    a light source; and
    means optically coupled to said light source and engagingly positioned between said display means and said printed circuit board for securing said display means to said printed circuit board, said securing means having a flange and a body, said flange securing said first means to said body, and for both damping vibrations from and backlighting said first means.

8. The display system according to claim 7 wherein said light guide comprises silicone.

9. The display system according to claim 7 wherein said display means comprises a liquid crystal display.

10. The display system according to claim 9 wherein said electrical conductor comprises a flexible printed circuit material coupled between said printed circuit board and said first means for providing said electrical coupling.

11. The display system according to claim 10 wherein said second means is positioned on said flexible printed circuit material.

* * * * *